(12) United States Patent
Riebe

(10) Patent No.: US 10,578,862 B2
(45) Date of Patent: Mar. 3, 2020

(54) AUTOMOTIVE HEAD-UP-DISPLAY

(71) Applicant: Bayerische Motoren Werke Aktiengesellschaft, Munich (DE)

(72) Inventor: Mark Riebe, Kranzberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/550,578

(22) Filed: Nov. 21, 2014

(65) Prior Publication Data

US 2015/0077857 A1 Mar. 19, 2015

Related U.S. Application Data

(63) Continuation of application No. PCT/EP2013/060361, filed on May 21, 2013.

(30) Foreign Application Priority Data

May 24, 2012 (DE) .......................... 10 2012 208 697

(51) Int. Cl.
*G02B 27/01* (2006.01)

(52) U.S. Cl.
CPC .. *G02B 27/0101* (2013.01); *G02B 2027/0123* (2013.01); *G02B 2027/0134* (2013.01); *G02B 2027/0141* (2013.01)

(58) Field of Classification Search
CPC .............. G02B 27/0101; G02B 27/017; G02B 27/0093; G02B 27/0172; G02B 2027/0118; G02B 2027/014; G02B 27/01; G02B 2027/0154; G02B 2027/0181; G02B 2027/0141; G02B 27/0149; G02B 2027/0123; G02B 2027/0138; G02B 2027/0187

(Continued)

(56) References Cited

U.S. PATENT DOCUMENTS

| 5,329,272 A | 7/1994 | Massarelli et al. |
| 5,805,341 A * | 9/1998 | Kuba ................. G02B 27/0172 |
| | | 359/630 |

(Continued)

FOREIGN PATENT DOCUMENTS

| DE | 10 2005 052 424 A1 | 5/2007 |
| DE | 10 2006 030 338 A1 | 1/2008 |
| DE | 10 2009 043 353 A1 | 3/2011 |

OTHER PUBLICATIONS

International Search Report dated Aug. 5, 2013 (Three (3) pages).

(Continued)

*Primary Examiner* — Darryl J Collins
*Assistant Examiner* — Journey F Sumlar
(74) *Attorney, Agent, or Firm* — Crowell & Moring LLP

(57) ABSTRACT

An automotive head-up display comprises an image generating device for generating a virtual image that is visible from an eyebox. The image generating device is designed such that the virtual image has a bi-ocular image area and at least one mono-ocular image area, which are visible from the eyebox. By means of the head-up display, a large overall image width of the virtual image can be implemented, without enlarging the optical apertures and thereby the required installation space for the head-up display.

11 Claims, 6 Drawing Sheets

(58) Field of Classification Search
USPC .................. 359/630, 631, 632, 633, 841, 13
See application file for complete search history.

(56) References Cited

U.S. PATENT DOCUMENTS

| | | | | |
|---|---|---|---|---|
| 5,991,073 | A * | 11/1999 | Woodgate | G02B 27/225 348/E13.004 |
| 6,259,565 | B1 * | 7/2001 | Kawamura | G02B 27/0101 248/917 |
| 2010/0073636 | A1 * | 3/2010 | Sasaki | G02B 27/0093 353/13 |
| 2011/0001639 | A1 * | 1/2011 | Sasaki | G02B 27/0101 340/995.19 |
| 2011/0052009 | A1 * | 3/2011 | Berkovich | G02B 27/01 382/106 |
| 2011/0235185 | A1 * | 9/2011 | Kanamori | G02B 27/01 359/630 |
| 2012/0075708 | A1 * | 3/2012 | Hagiwara | B60K 35/00 359/630 |
| 2012/0224062 | A1 * | 9/2012 | Lacoste | G01C 21/365 348/148 |
| 2014/0159994 | A1 * | 6/2014 | Garcia | B60K 35/00 345/3.1 |

OTHER PUBLICATIONS

German Search Report dated Feb. 9, 2013, with Statement of Relevancy (Five (5) pages).
Anonymous: "Head-Up Display 2.0 Augmented Reality", BMW, Oct. 7, 2011, XP002701082, URL:http://www.bmwblog.com/2011/10/07/head-up-display-2-0-augmented-reality/, 16 pages.
Poitschke et al., "Contact-analog Information Representation in an Automotive Head-Up Display", ETRA 2008, Savannah, Georgia, Mar. 26-28, 2008, Jan. 1, 2008, XP055070820, URL:http://www.mmk.ei.tum.de/publ/pdf/08/08poil.pdf, 4 pages.

* cited by examiner

AUTOMOTIVE HEAD-UP-DISPLAY

CROSS REFERENCE TO RELATED APPLICATIONS

This application is a continuation of PCT International Application No. PCT/EP2013/060361, filed May 21, 2013, which claims priority under 35 U.S.C. § 119 from German Patent Application No. 10 2012 208 697.8, filed May 24, 2014, the entire disclosures of which are herein expressly incorporated by reference.

BACKGROUND AND SUMMARY OF THE INVENTION

The invention relates to an automotive head-up display with an expanded virtual image width.

In a motor vehicle, technical information, such as the current speed, the rotational speed of the engine or the oil temperature as well as traffic and navigation data are provided to the driver during the drive. The information is usually displayed on an instrument panel. When reading the displayed information from the instrument panel, the driver is at least briefly distracted from the traffic situation. Head-up displays make it possible to display information directly in the driver's visual range on the windshield of the vehicle. As a result, information contents can be acquired while the road conditions simultaneously remain in the driver's field of view.

Modern head-up displays generate a virtual image which to the driver appears to be situated at some distance in front of the windshield, for example, at the end of the engine hood. The virtual image can generally only be seen from a defined area, the so-called eyebox. The eyebox is usually designed such that the complete virtual image can be seen from the entire desired eyebox area.

The representation of increasingly larger virtual images is demanded from future head-up displays. In particular, contact-analogous head-up displays require the overlapping of the visual image by a largest possible portion of the road scene situated in front of the vehicle. In the case of an eyebox of the same design, however, together with the size of the virtual image, the size of the required optical component of a head-up display, for example, of the instrument panel detail or mirror apparatuses, will clearly increase. This makes the geometric integration of the head-up display in the narrowly dimensioned installation space in the instrument panel clearly more difficult.

It is desirable to indicate an automotive head-up display where the virtual image area is broadened and which nevertheless requires only little installation space. Furthermore, a vehicle having an automotive head-up display with a broadened virtual image area is to be indicated, in which case, the head-up display needs only a relatively small installation space in the instrument panel of the vehicle.

According to an embodiment, an automotive head-up display comprises an image generating device for generating virtual image which is visible from an eyebox. The image generating device is designed such that the virtual image has a bi-ocular image area and at least one mono-ocular image area which are visible from the eyebox.

In the case of the automotive head-up display, the eyebox is split into an area for the left eye and an area for the right eye. In the center of the virtual image, an area is situated for which the eyebox is designed such that the image area for the virtual image is visible for both eyes (bi-ocular). In addition, the virtual image has an additional image area on at least one side and preferable on both sides of the bi-ocular image area, which image area can in each case be seen only by an observer's one eye (mono-ocular). The generating of the additional mono-ocular image area can be achieved by a suitable design of the display and/or of the mirror apparatuses of the image generating device. The type of eyebox construction makes it possible to implement a larger overall image width of the virtual image without having to broaden the optical apparatuses and therefore the HUD (head-up display) package.

The splitting into a bi-ocular and at least one mono-ocular image area can also be reflected in the splitting of the display contents. In the bi-ocular image area, for example, information contents, which are permanently or frequently shown, can be displayed (static contents). The mono-ocular image areas may be used, for example, for image contents which are only displayed for a short time (dynamic contents). As a result, a driver's possible irritation can be minimized because of the only mono-ocularly visible areas.

The arrangement is particularly advantageous for contact-analogous head-up displays, because, particularly in the case of those displays, large image widths are demanded in order to cover an area that is as large as possible on the adjacent lanes of a vehicle. The above-mentioned splitting of the display contents can also advantageously be used in the case of a contact-analogous head-up display. Permanently displayed information, such as the speed of the vehicle, and contact-analogous contents in the own driving lane can be displayed in the bi-ocular central image area of the virtual image. Dynamic contact-analogous contents, which have to be displayed only according to the situation and for a short time, may be displayed in the outer mono-ocular image areas.

The invention will be explained in detail in the following by means of figures which illustrate the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
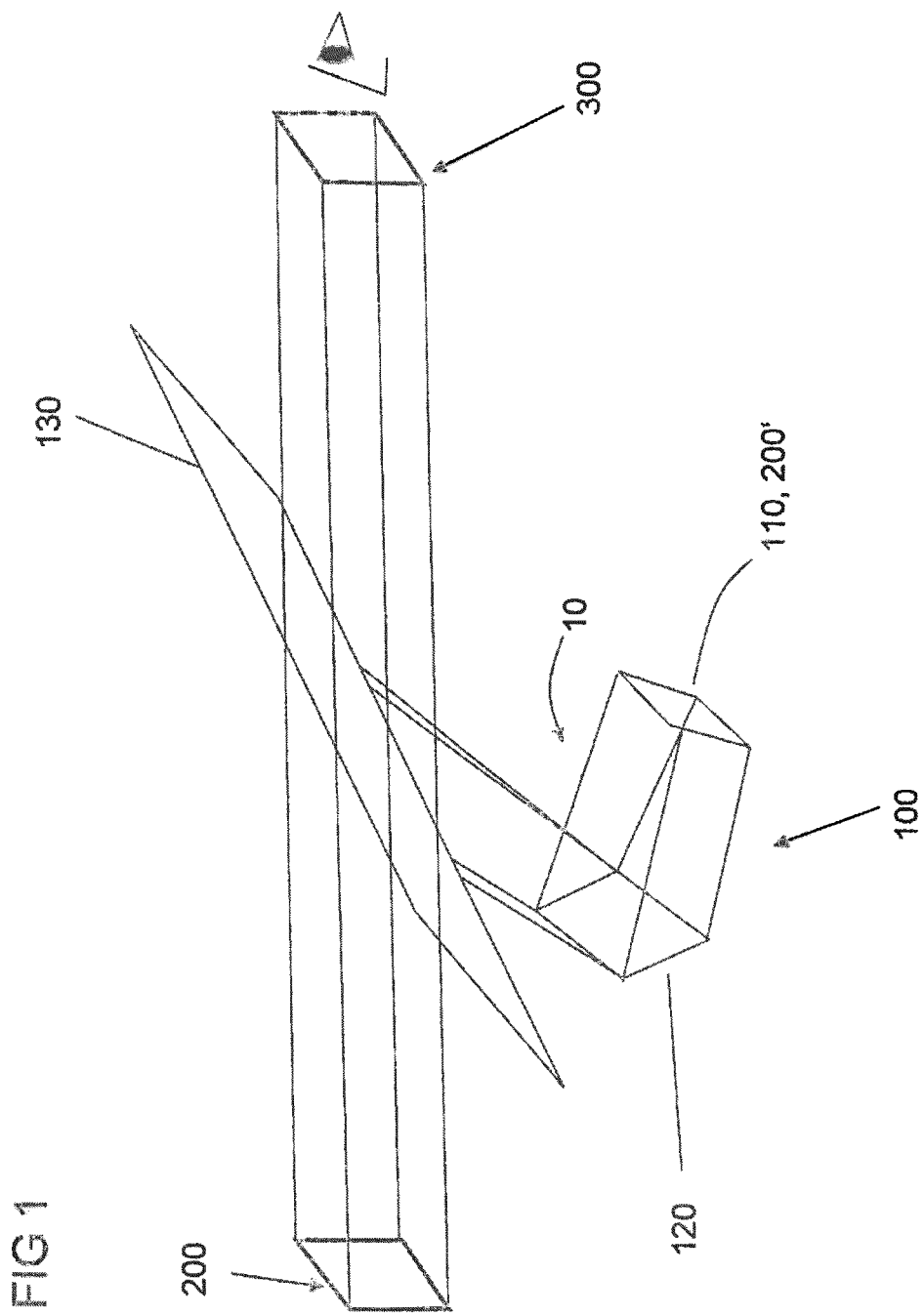
FIG. 1 is a view of an embodiment of an automotive head-up display for generating a virtual image.

FIG. 1 illustrates an embodiment of an automotive head-up display 10 which can be used in a vehicle. The head-up display 10 comprises an image generating device 100 for generating a virtual image 200. The image generating device 100 has a display 110 for generating a real image 200' and imaging optics for generating the virtual image 200. The imaging optics may, for example, contain lenses and mirrors.

For reasons of simplification, the imaging optics in FIG. 1 is represented by an imaging mirror 120 and a windshield 130 as the last mirror of the imaging optics.

The real image 200' generated by the display 110 is imaged on the mirror 120 and is projected from there onto the windshield 130. For an observer, for example, a driver, a virtual image appears at some distance in front of the windshield 130. The imaging optics are designed such that the real image in the display 110 is enlarged by the imaging optics and the felt distance at which the virtual image is formed in front of the windshield may amount to several meters. The head-up display imaging optics should be designed such that tall and short drivers can see the visual image completely and with homogenous brightness.

Figure 2:
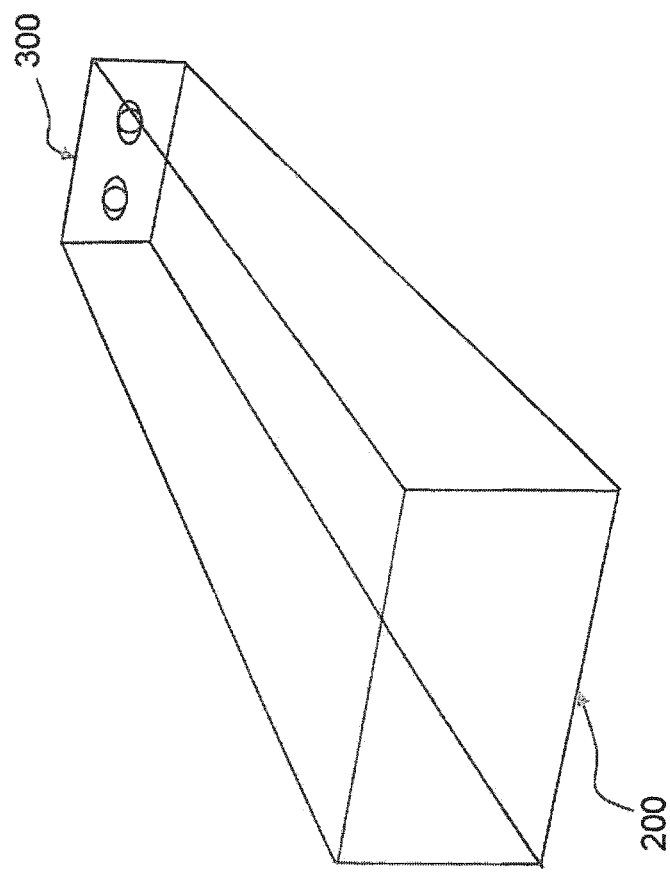
FIG. 2 is a view of an embodiment of an eyebox for observing a virtual image.

The area from which the virtual image 200 can be seen completely is called an eyebox 300. FIG. 2 shows a course of rays between the corners of the eyebox 300 and the virtual image 200. The visible ray volume is limited by the marginal rays and is generated by the image generating device 100. So that the entire virtual image 200 can been seen by the observer with both eyes from the eyebox, the display 110, the mirrors of the imaging optics 120 and an entrance opening in the instrument panel from which the image is projected onto the windshield, should have a certain size. In this case, the outermost ray paths essentially determine the size of the required mirrors.

In order to generate a large virtual image, the visible ray volume also has to be enlarged in the case of the embodiment of the head-up display illustrated in FIG. 1. For this purpose, it is necessary to also correspondingly enlarge the display 110 as well as the components of the imaging optics. A correspondingly enlarged installation space has to be provided in the instrument panel of the vehicle in which the display 110 and the imaging optics 120 are integrated.

Figure 3:
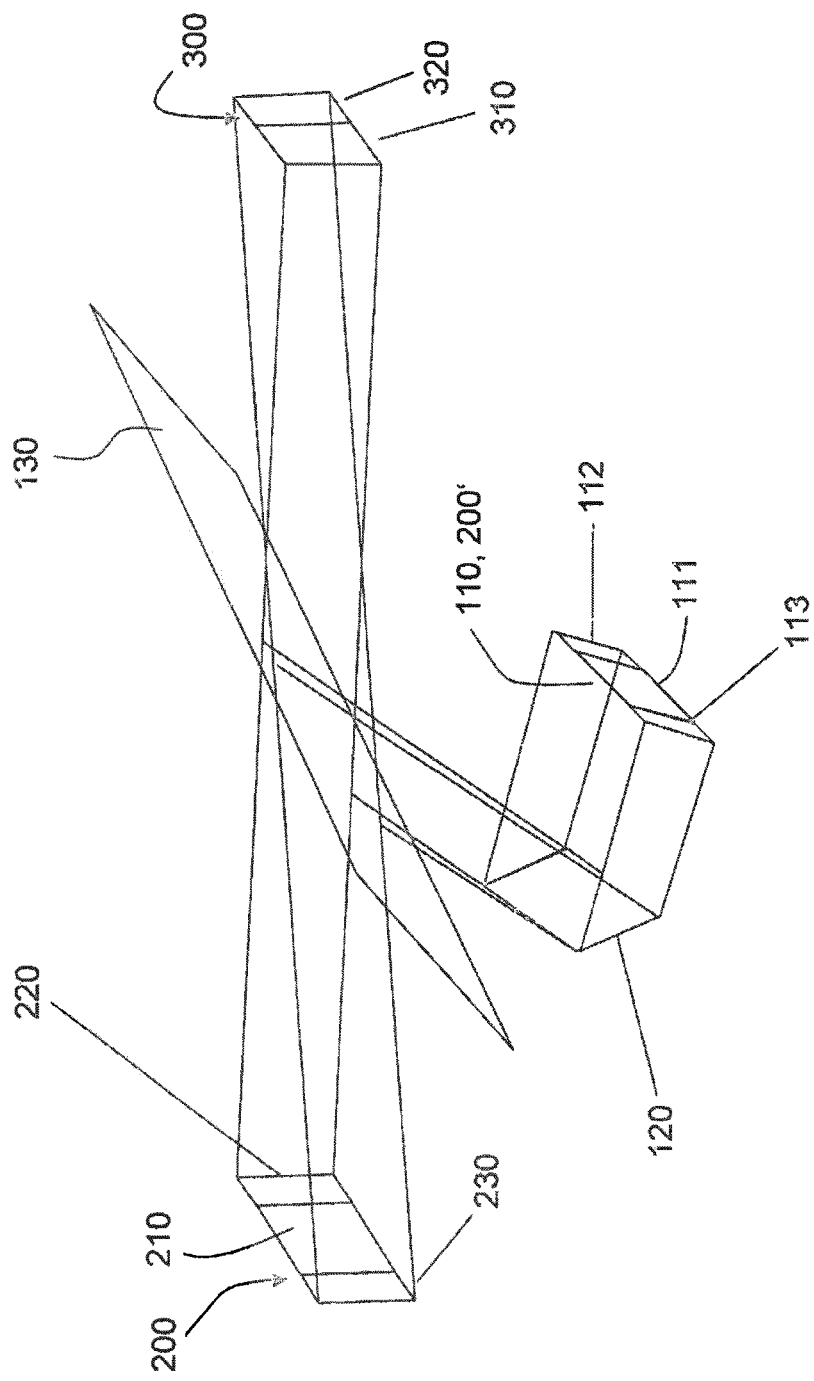
FIG. 3 is a view of an embodiment of an automotive head-up display for generating a virtual image with a broadened image width.

FIG. 3 shows an embodiment of a head-up display, in which the virtual image 200 generated by means of the head-up display, is broadened in comparison to the virtual image that was generated by means of the head-up display illustrated in FIG. 1. The image generating device 100 generates the virtual image 200 such that, viewed from the eyebox 300, the virtual image has a bi-ocular image area 210 and at least one mono-ocular image area 220, 230. In the embodiment of the head-up display illustrated in FIG. 3, the virtual image 200 is generated with a first mono-ocular image area 220 and a second mono-ocular image area 230. The bi-ocular image area 210 is situated between the two mono-ocular image areas 220, 230. The image generating device 100 generates the virtual image such that the bi-ocular image area 210 can been seen by the observer from the eyebox 300 with both eyes, and the at least one mono-ocular image area 220, 230 can been seen by the observer from the eyebox 300 with one eye.

The image generating device 100 comprises a display 110 for generating a real image 200' and imaging optics 120, 130 for generating the virtual image 200. The imaging optics may have lenses and mirrors. For reasons of simplification, FIG. 3 also only shows a mirror 120 and a mirror 130 of the imaging optics. A real image 200' generated by the display 110 first impinges on the mirror 120 and is projected by the mirror 120 on the mirror 130. The mirror 130 may be constructed as a windshield of a vehicle. The image generating device 100 has the effect that, for an observer, the visual image is generated at a distance in front of the windshield 130 with the bi-ocular image area 210 and the at least one mono-ocular image area 220, 230.

For generating the virtual image with the image area broadened in comparison to FIGS. 1 and 2, the display 110 next to the display area 111, which has the same size as the display of the embodiment in FIG. 1, has additional display areas 112 and 113. The additional display areas 112 and 113 generate the additional virtual image areas 220 and 230. In comparison to the embodiment of FIG. 1, the imaging optics 120, 130, particularly the mirror surface of the imaging mirror 120 remains unchanged. The additional image surfaces 220, 230 of the virtual image are therefore generated only by a broadening of the display 110. The maximal expansion of the image width of the virtual image by the eyebox is defined by the given mirror surface of the imaging mirror 120 and the entire width of the eyebox.

Figure 4:
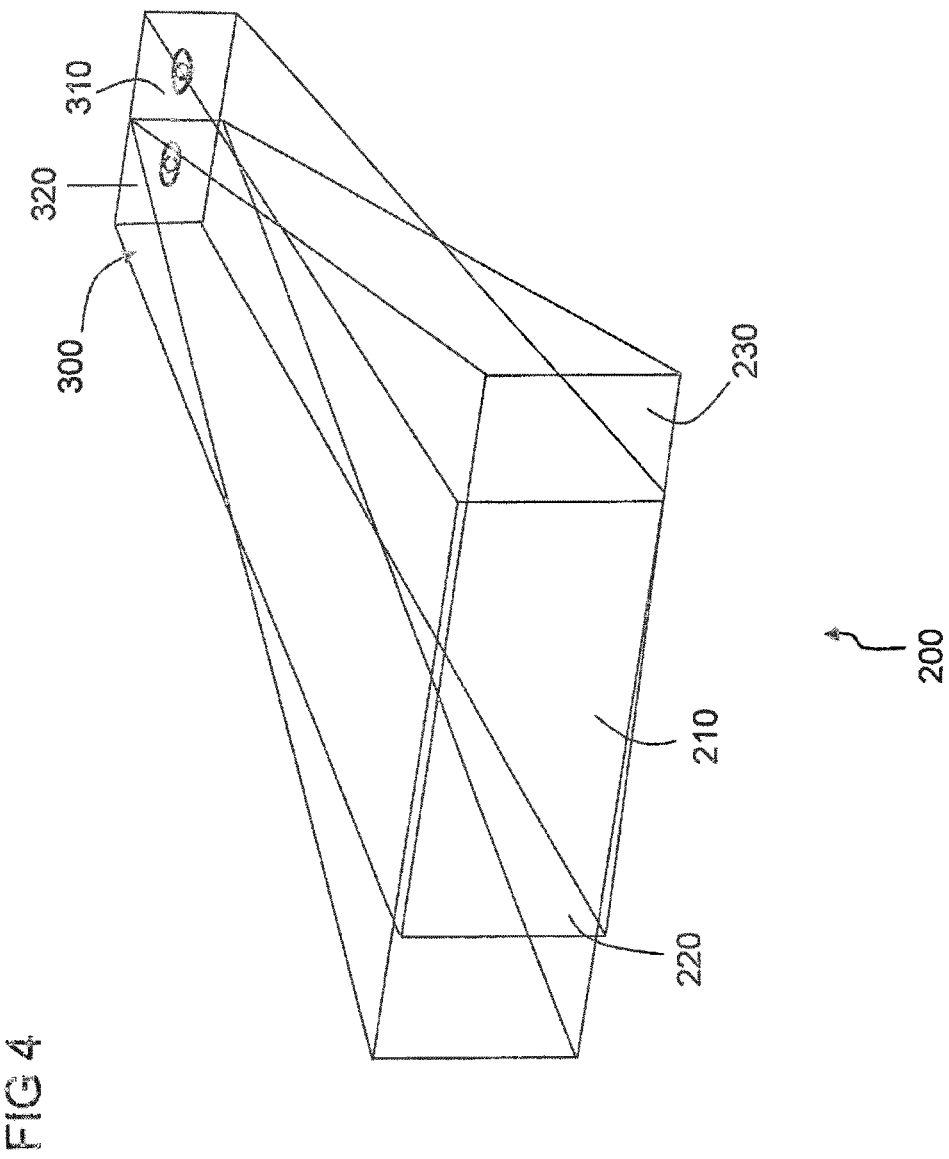
FIG. 4 is a view of an embodiment of an eyebox for observing a virtual image with a broadened image width.

FIG. 4 illustrates a ray path between the eyebox 300 and the virtual image 200, which was generated by means of the embodiment of a head-up display illustrated in FIG. 3. The image generating device 100 produces the virtual image 200 such that, in the virtual image 200, the bi-ocular image area 210 is arranged between the first and second of the at least one mono-ocular image area(s) 220, 230. The eyebox 300 is split into two partial areas. From the partial area 310, which is, for example, assigned to an observer's left eye, the additional image surface 220 of the virtual image can be seen, for example, by an observer's left eye. From the partial area 320 of the eyebox, which is, for example, assigned to an observer's right eye, the additional image surface 230 of the virtual image can be seen, for example, by the observer's right eye. The overlapping area 210 of the virtual image can be seen by both eyes of the observer from the eyebox 300.

When the light ray volume between the virtual image 200 and the eyebox 300 is observed, it can be recognized that the cross-section in approximately the center of the visible ray volume between the virtual image and the eyebox, in comparison to the cross-section of the light beam volume illustrated in FIG. 2, retains approximately the same size. However, simultaneously a larger overall image area of the virtual image can be implemented because, in addition to the overlapping area 210, there are still the two marginal areas 220, 230 in the virtual image. A wider virtual image can thereby be implemented with an essentially constant beam cross-section and therefore an approximately constant installation volume of the image generating device below the instrument panel of a vehicle. Only the display 110 has additional display areas 112, 113 for generating the mono-ocular image areas 220, 230.

Figure 5:
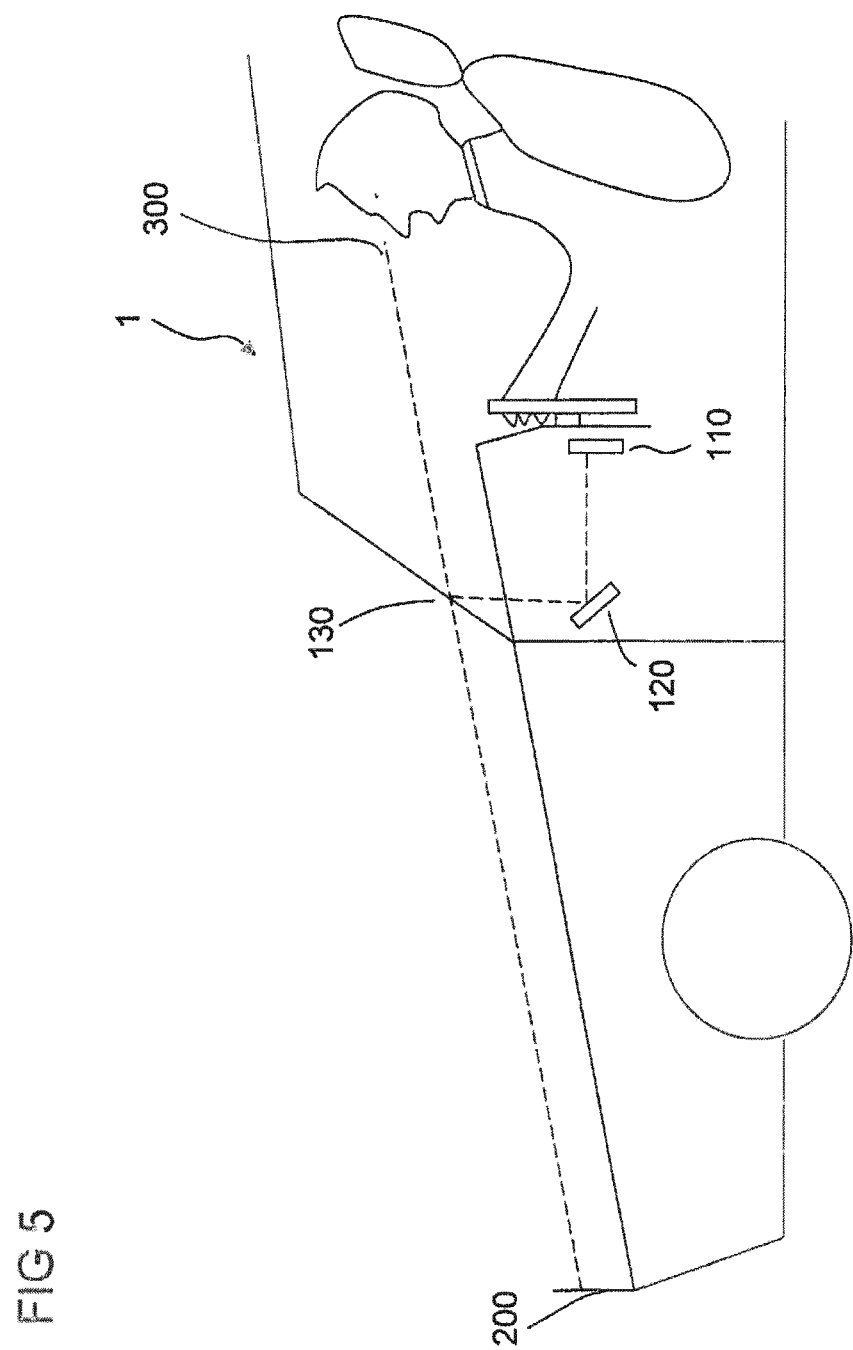
FIG. 5 is a view of an embodiment of a vehicle having an automotive head-up display for generating a virtual image with a broadened image width.

FIG. 5 illustrates a vehicle 1, particularly an automobile which comprises an automotive head-up display according to the embodiment illustrated in FIG. 3. The head-up display comprises the display 110 for generating a real image, and the imaging optics with the imaging mirrors 120, 130. The imaging mirror 120 projects the image directed onto it by the display 110 onto the mirror 130, which forms the windshield of the vehicle. From the driver's eyebox 300, the virtual image 200 with the bi-ocular and the at least one mono-ocular image area appears at a distance in front of the windshield 130.

The splitting of the virtual image into a bi-ocular and at least one mono-ocular image area may also be reflected in the display contents of the virtual image.

Figure 6:
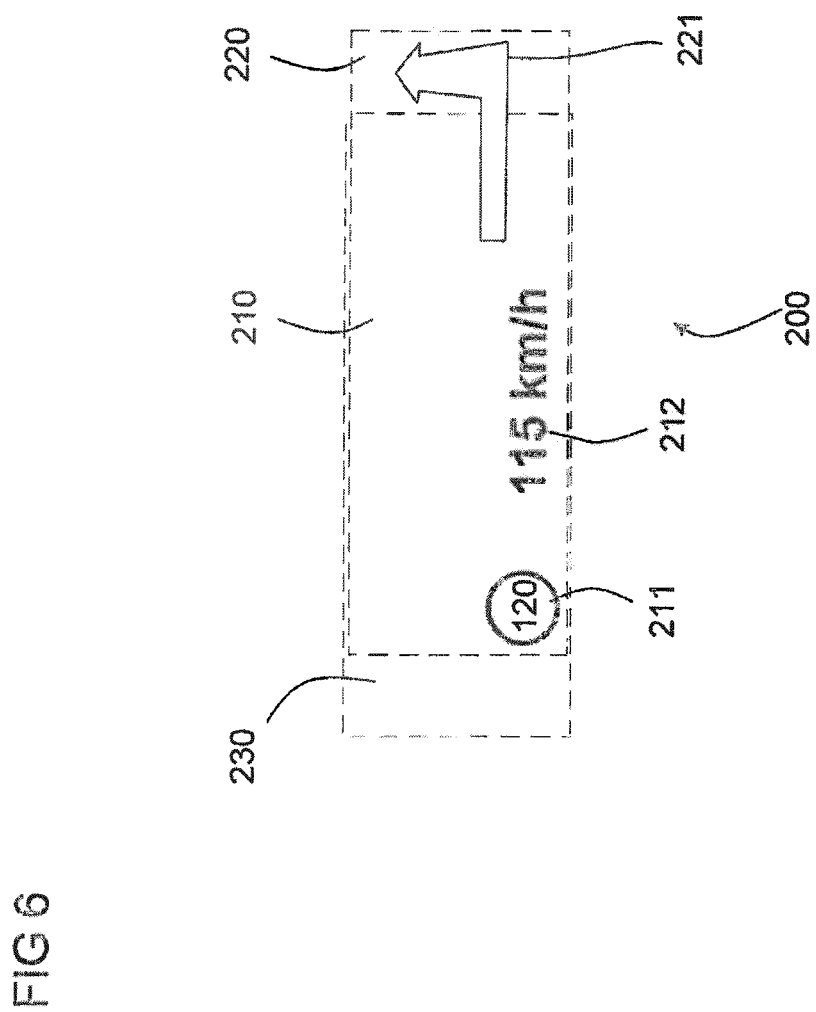
FIG. 6 is a view of a display of information in a virtual image with a broadened image width.

The image generating device 100 may be designed such that static display contents, which are permanently or frequently displayed, are displayed in the bi-ocular image area 210. Furthermore, the image generating device 100 may be constructed such that, in the mono-ocular image areas, image contents are displayed which have to be displayed only according to the situation or for a brief time. In the example of FIG. 6, essentially static information, such as a permissible maximal speed 211 or a current speed 212 of the vehicle, and, as required, additional dynamic information is displayed in the common bi-ocular image field 210. For example, a turn arrow 221 briefly superimposed by a navigation system is displayed in the mono-ocular image area 220.

The splitting of the display contents can advantageously also be used for contact-analogous head-up displays. Permanently displayed contents, such as the speed of the vehicle, and contact-analogous contents that are situated on the own driving lane of the vehicle, can be displayed in the bi-ocular central image area. Contact-analogous contents in the outer mono-ocular image areas may, for example be lane change, turn or warning information which only has to be displayed depending on the situation and for a brief time.

LIST OF REFERENCE NUMBERS

1 Vehicle
10 Automotive head-up display
100 Image generating device
110 Display
120 Imaging mirror
130 Windshield
200' Real image
200 Virtual image
210 Bi-ocular image area
220, 230 Mono-ocular image area
300 Eyebox The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automotive head-up display, comprising:
   an image generating device that generates a virtual image via projecting a corresponding real image, generated by a single display, onto a windshield, the virtual image being visible by an observer positioned in front of an eyebox, the virtual image comprising:
      a bi-ocular image area viewable from the eyebox by both naked eyes of the observer, and
      at least one mono-ocular image area viewable from the eyebox by an associated naked eye of the observer positioned in front of a first partial area of the eyebox, and not viewable by a non-associated naked eye of the observer that is not positioned in front of the first partial area of the eyebox,
   wherein the bi-ocular image area is an overlapping image area such that, from the eyebox, the associated naked eye is able to view the bi-ocular image area and the associated mono-ocular image area.

2. The automotive head-up display according to claim 1, wherein the image generating device generates the virtual image such that, in the virtual image, the bi-ocular image area is arranged between a first and a second of the at least one mono-ocular image area.

3. The automotive head-up display according to claim 2, wherein the image generating device generates the virtual image such that the first mono-ocular image area can be seen from the eyebox by an observer with his left naked eye, and the second mono-ocular image area can be seen from the eyebox by the observer with his right naked eye.

4. The automotive head-up display according to claim 1, wherein the image generating device is designed such that static content is displayed in the bi-ocular image area of the virtual image, and dynamic content is displayed in the at least one mono-ocular image area.

5. The automotive head-up display according to claim 1, wherein the image generating device is designed such that static and dynamic content are displayed in the bi-ocular image area of the virtual image.

6. The vehicle according to claim 5, wherein contact-analogous contents, which relate to the own driving lane of the vehicle, are displayed in the bi-ocular image area of the virtual image, and contact-analogous contents, which relate to the neighboring lane of the vehicle, are displayed in the at least one mono-ocular image area of the virtual image.

7. The automotive head-up display according to claim 1,
   wherein the image generating device comprises imaging optics for generating the virtual image, and
   wherein the display has a display area, which generates the bi-ocular image area of the virtual image, and has at least one further display area, which generates at least one mono-ocular image area of the virtual image.

8. The automotive head-up display according to claim 1, wherein the head-up display is designed as a contact-analogous head-up display.

9. The automotive head-up display according to claim 1, further comprising:
   imaging optics configured to generate the virtual image,
   wherein the image optics includes at least one mirror, and
   wherein the at least one mono-ocular image area viewable by the associated naked eye is not viewable by the non-associated naked eye as a result of, at least in part, a size of the at least one mirror.

10. A vehicle comprising:
    an automotive head-up display,
    wherein the automotive head-up display comprises an image generating device that generates a virtual image via projecting a corresponding real image, generated by a single display, onto a windshield, the virtual image being visible by an observer positioned in front of an eyebox,
    wherein the virtual image has a bi-ocular image area viewable from the eyebox by both naked eyes of the observer, and at least one mono-ocular image area viewable from the eyebox by an associated naked eye positioned in front of a first partial area of the eyebox, and not viewable by a non-associated naked eye that is not positioned in front of the first partial area of the eyebox,
    wherein the bi-ocular image area is an overlapping image area such that, when positioned in front of the first partial area of the eyebox, the associated naked eye is able to view the bi-ocular image area and the associated mono-ocular image area.

11. The vehicle according to claim 10, wherein the automotive head-up display further comprises:
    imaging optics configured to generate the virtual image,
    wherein the image optics includes at least one mirror, and
    wherein the at least one mono-ocular image area viewable by the associated naked eye is not viewable by the non-associated naked eye as a result of, at least in part, a size of the at least one mirror.

* * * * *